Feb. 4, 1969 P. A. DE LANGIS 3,426,342
GROUND ABSENCE DETECTOR AND PROTECTIVE DEVICE
Filed May 23, 1966

INVENTOR.
PHILIP A. DELANGIS

BY Herman L Gordon
ATTORNEY

INVENTOR
PHILIP A. DE LANGIS

BY *Herman L. Gordon*

ATTORNEY

United States Patent Office 3,426,342
Patented Feb. 4, 1969

3,426,342
GROUND ABSENCE DETECTOR AND
PROTECTIVE DEVICE
Philip A. De Langis, Seattle, Wash., assignor to Physio-Control Corporation, Seattle, Wash., a corporation of Delaware
Filed May 23, 1966, Ser. No. 552,267
U.S. Cl. 340—255  10 Claims
Int. Cl. G08b 21/00; H02h 1/02

This invention relates to electrical safety devices, and more particularly to attachments for detecting the absence of ground connections in electrical outlets and for insuring that an electrical appliance or instrument plugged into an outlet is properly grounded.

A main object of the invention is to provide a novel and improved ground-absence detector which is simple in construction, which is easy to attach, which provides a positive indication of the absence of a ground connection in a supply outlet receptacle, and which does not allow power to be supplied to an associated load device unless the supply outlet receptacle includes a proper ground connection.

A further object of the invention is to provide an improved ground-absence detection and protective device which may either be employed as an accessory adapted to be connected between a supply socket and an electrically operated appliance or instrument, or which may be built into the appliance or instrument, the device being inexpensive to manufacture, being reliable in operation, and greatly reducing electrical hazards in using the appliance or instrument by insuring that the supply socket is properly grounded before allowing the appliance or instrument to be energized, as well as providing a clear and positive indication of the absence of a proper ground.

A still further object of the invention is to provide an improved ground-absence detection and protective apparatus of the type employing a balanced circuit, wherein when a proper ground is not present at a supply socket, the apparatus provides a warning signal and prevents transmission of power to a load device connected thereto, and wherein when a proper ground is present at the supply socket, the apparatus shorts out one half of the balanced circuit, producing an unbalanced condition which not only causes the warning signal to become deenergized but also allows power to be transmitted to the load device, the apparatus including means to insure that the load device employs a proper three-prong plug having a grounding prong.

Further objects and advantages of the invention will become apparent from the following description and claims, and from the accompanying drawings, wherein:

Figure 1:
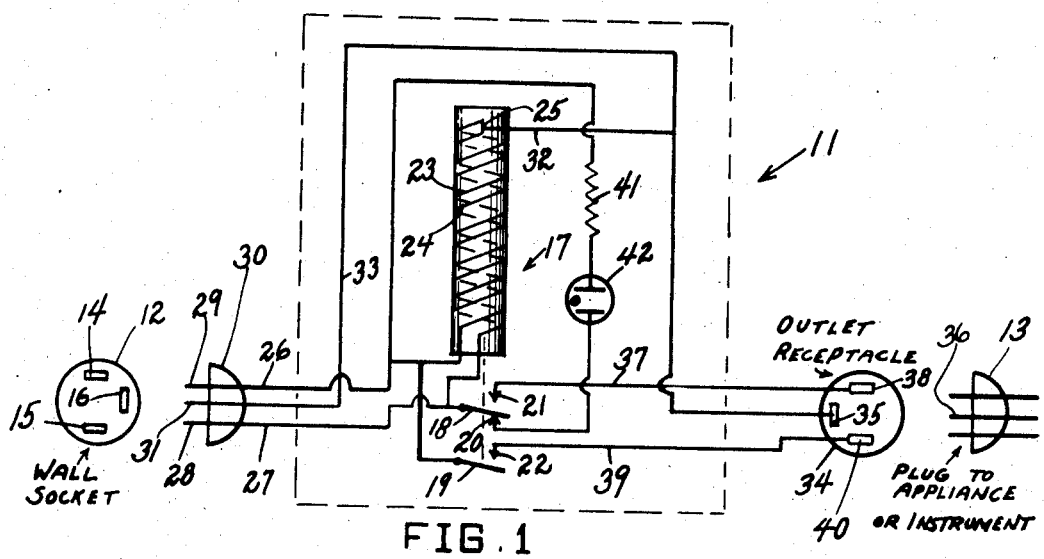
FIGURE 1 is a schematic wiring diagram of one form of electrical safety device constructed in accordance with the present invention.

Referring to the drawings, and more particularly to FIGURE 1, 11 generally designates a ground-absence detector and protective device adapted to be employed as an accessory connected between a wall socket 12 and the power supply plug 13 leading to an electrical instrument or appliance. The wall socket 12 is of the type having a pair of female supply line outlet terminals 14 and 15 and a female ground terminal 16, which should be connected to one of the line outlet terminals 14 or 15 in the installation. Thus, in the normal installation, one of the single phase supply lines leading to the terminals 14 and 15 is grounded. However, it frequently happens that the ground connection between terminal 16 and one of the line terminals 14 or 15 is absent, creating a dangerous condition for users of appliances or instruments plugged into the socket 12.

A prime purpose of the apparatus 11 is to detect the absence of the ground connection of socket 12 and to prevent energization of an appliance or instrument from said socket when the ground connection is not present.

The apparatus 11 comprises a specially constructed alternating current relay 17 having a pair of poles 18 and 19. In the normally deenerzide condition of the relay, the pole 18 engages a bottom stationary contact 20, and when the relay is energized, pole 18 moves away from contact 20 and engages a stationary upper contact 21. Also, when the relay is energized, the remaining pole 19 moves into engagement with a stationary contact 22.

The relay 17 is provided with bifilar windings 23 and 24 wound so that current passing through one of the windings produces flux in the relay core in one direction, while current flowing through the other winding produces equal and opposite flux. When both windings receive current the relay remains deenergized, but the relay becomes energized when only one of said windings receives current.

The windings 23 and 24 have a common tap 25. The opposite ends of said windings are connected to respective input conductors 26 and 27 leading to the line prongs 29 and 28 of a conventional three-prong plug 30, which also includes a ground prong 31. The common coil tap 25 is connected by a wire 32 to a ground wire 33 connected to ground prong 31.

The device 11 is provided with a female outlet receptacle 34 adapted to receive the conventional three-prong plug 13 associated with an appliance or instrument to be energized from the supply socket 12. Receptacle 34 is provided with a female ground terminal 35 adapted to receive the ground prong 36 of plug 13. Wire 33 is connected to terminal 35. Pole 19 is connected to wire 26.

Pole 18 is connected to wire 27 and stationary contact 21 is connected by a wire 37 to one of the female outlet receptacle line terminals 38. Stationary contact 22 is connected by a wire 39 to the remaining female outlet line terminal 40 of receptacle 34.

Connected in series between wire 26 and stationary contact 20 are a resistor 41 and a neon lamp 42.

When plug 30 is engaged in socket 12, the line prongs 28 and 29 engage the line terminals 15 and 14 and the ground prong 31 engages the "ground" terminal 16. If there is no ground connection for either line terminal 14 or 15, namely, if the installation does not contain a connection of terminal 16 to either line terminal, equal currents flow through the relay windings 23 and 24, and poles 18 and 19 remain in their normal lowered positions. The supply line circuits to outlet receptacle terminals 38 and 40 therefore remain open at contacts 18–21 and 19–22, and the associated load device plugged into receptacle 34 cannot be energized. Warning lamp 42 becomes energized through a circuit comprising line wire 26, resistor 41, lamp 42, closed contacts 20–18, and line wire 27. This notifies the user of the absence of a ground connection so that appropriate measures may be taken.

If one of the line terminals 14 or 15 is in fact connected to ground terminal 16 in the installation, say, terminal 15, the corresponding relay winding 24 is shunted by wire 32, ground wire 33 and the ground connection in the installation, allowing relay 17 to become energized and causing poles 18 and 19 to move into engagement with contacts 21 and 22, as above described, and causing lamp 42 to become deenergized by the opening of contacts 18–20. The appliance or instrument can then be safely energized in the normal manner by plugging it into receptacle 34.

Figure 2:
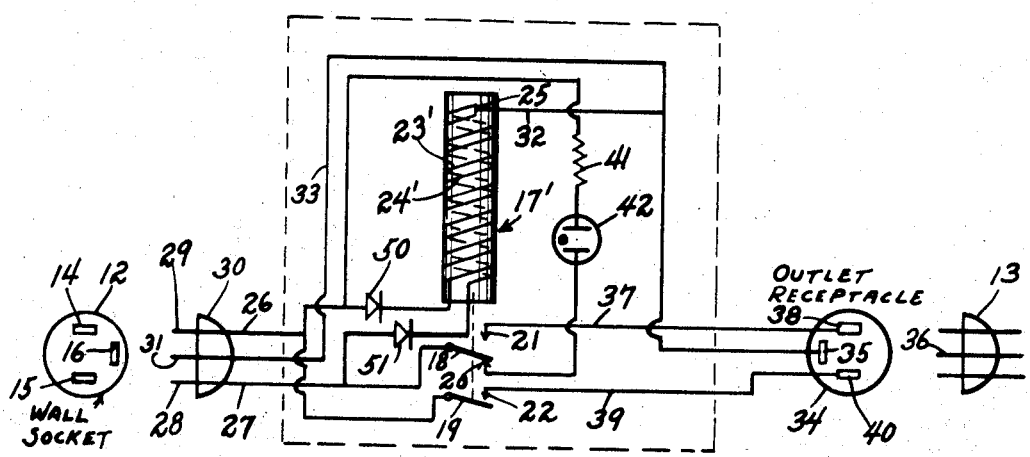
FIGURE 2 is a schematic wiring digram of a modification of the safety device shown in FIGURE 1.

In the modification illustrated in FIGURE 2, the bifilar-wound relay, shown at 17', is a direct-current relay having the bifilar windings 23' and 24'. Respective diode rectifiers 50 and 51 are connected in series with the windings 23' and 24' to rectify the current supplied thereto. The operation of the circuit of FIGURE 2 is otherwise the same as that of FIGURE 1.

Figure 3:
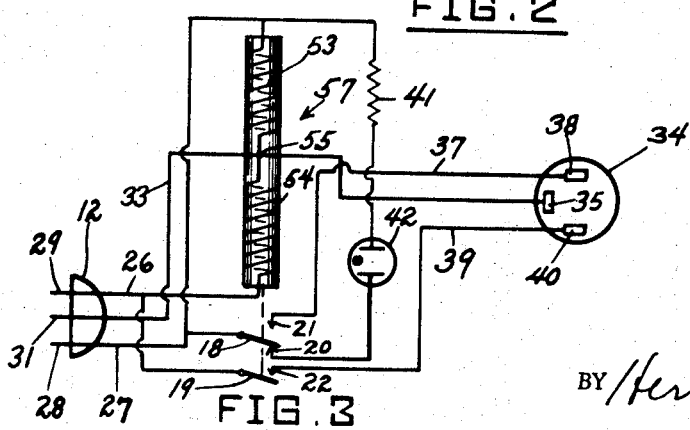
FIGURE 3 is a schematic wiring diagram of another form of safety device according to the present invention.

In the embodiment illustrated in FIGURE 3, the alternating current relay, shown at 57, has the series-connected windings 53 and 54 and has the common center tap 55. The total impedance of the series-connected windings 53 and 54 is so great that when they are connected across the line conductors, insufficient current flows in the windings to energize the relay, and the relay poles 18 and 19 remain in their normal positions. However, each winding 53 and 54 has an impedance sufficiently low that when the line conductors are connected across either winding alone, the current flow therethrough will be sufficient to energize the relay. It will be seen from FIGURE 3 that when there is a connection between either line wire 26 or 27 and the ground wire 33 (provided by a proper ground connection in the supply receptacle into which plug 12 is plugged) one of the windings 53 or 54 will be shunted and line voltage will be applied to the other winding. This causes relay 57 to become energized and to establish the line connections to outlet receptacle 34 at relay contacts 18–21 and 19–22, and to open the energizing circuit for lamp 42 at contacts 18–20. In the absence of a proper ground at the supply wall socket, relay 57 will receive line voltage across the series-connected windings thereof and will fail to be energized. Warning lamp 42 will be energized, since contacts 18–20 remain closed.

Within the spirit of the present invention, various other relay coil arrangements may be employed, characterized by the fact that the coils are wound in such a way that the relay will not become energized by application of line voltage thereto unless a portion of the relay winding is shorted out.

Figure 4:
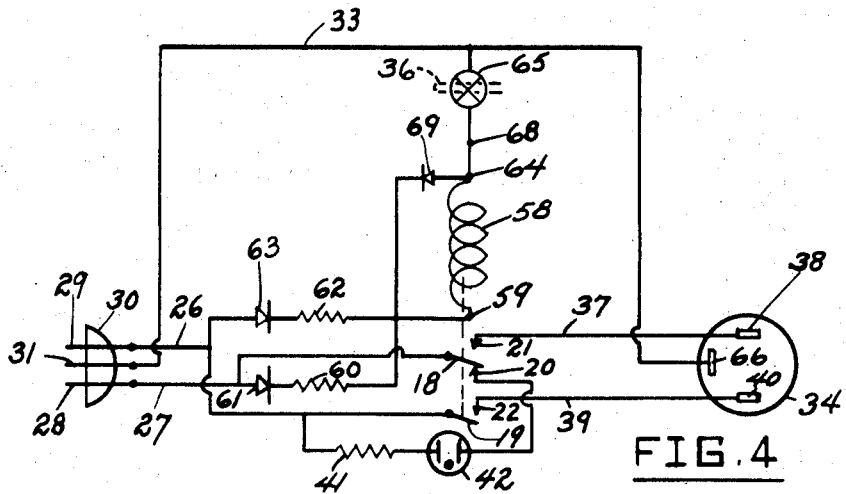
FIGURE 4 is a schematic wiring diagram showing a further modification according to the present invention.

In the embodiment shown in FIGURE 4, the single-wound relay coil, shown at 58, has one terminal 59 thereof connected to wire 27 through a first branch comprising a resistor 60 and a rectifier 61, and also connected to wire 26 through a similar second branch comprising a resistor 62 and a rectifier 63. A rectifier 69, poled oppositely to rectifiers 61 and 63, is connected across the terminals 64, 59 of the relay coil. Terminal 64 is connected to wire 33 through a load ground prong detection switch device, designated generally at 65, and being closed when a proper three-prong load plug 13 is inserted in the load socket 34.

Figure 11:
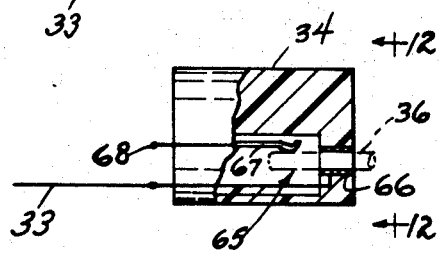
FIGURE 11 is a schematic elevational view, partly in cross-section, of a load connection socket employed with a safety device according to the present invention to insure the use of a proper three-prong ground plug with the load device connected to a supply socket through the safety device.
Figure 12:
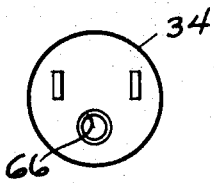
FIGURE 12 is an elevational view taken substantially on the line 12—12 of FIGURE 11.

As shown in FIGURE 11, the switch device may comprise a sleeve 66 in socket 34 adapted to receive the load plug ground prong 36, and a spring contact 67, the spring contact 67 being connected to a socket terminal 68. The ground prong 36, when inserted, bridges the sleeve 66 and the contact 67. The absence of said ground prong 36 creates an open circuit at 33–68.

In FIGURE 4, relay coil terminal 64 is connected to socket terminal 68.

In the absence of a proper ground connection at the supply socket 12, the opposing rectifiers 63 and 69, or 61 and 69, prevent coil 58 from being energized by line wires 26 and 27. However, if a proper supply socket ground connection is present (and with switch device 65 closed) coil 58 can be energized from either wire 26 or 27 through either rectifier 63 or 61 to ground, the rectifier 69, in either case, acting as an open circuit.

Figure 5:
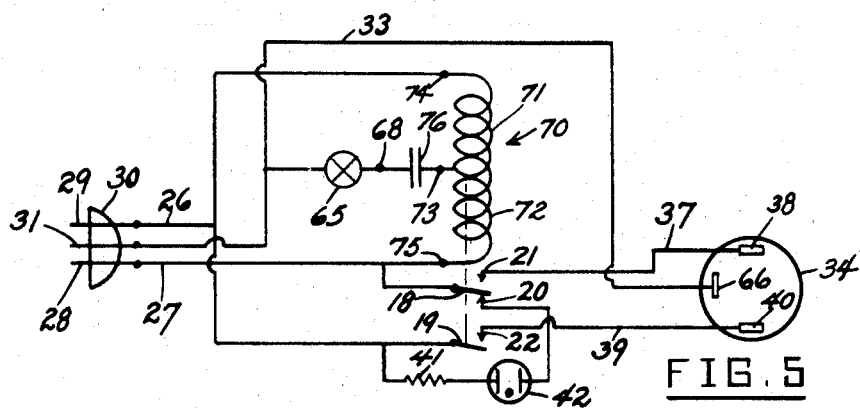
FIGURE 5 is a wiring diagram of still another form of electrical safety device according to this invention.

In the embodiment shown in FIGURE 5, the relay coil, shown at 70, has similar but opposing windings 71 and 72, with a common terminal 73. Line wire 26 is connected to the end terminal 74 of winding 71 and line wire 27 is connected to the end terminal 75 of winding 72. Wire 33 is connected to common terminal 73 through a load ground prong detection switch 65 and a condenser 76. With no proper ground connection at the supply socket, the opposing windings 71, 72 coact to prevent effective energization of the coil 70. However, if a proper ground connection is present in the supply socket (and switch device 65 is closed) either one or the other of the windings will be in effect shunted by the condenser 76 and the relay coil will be effectively energized.

Figure 6:
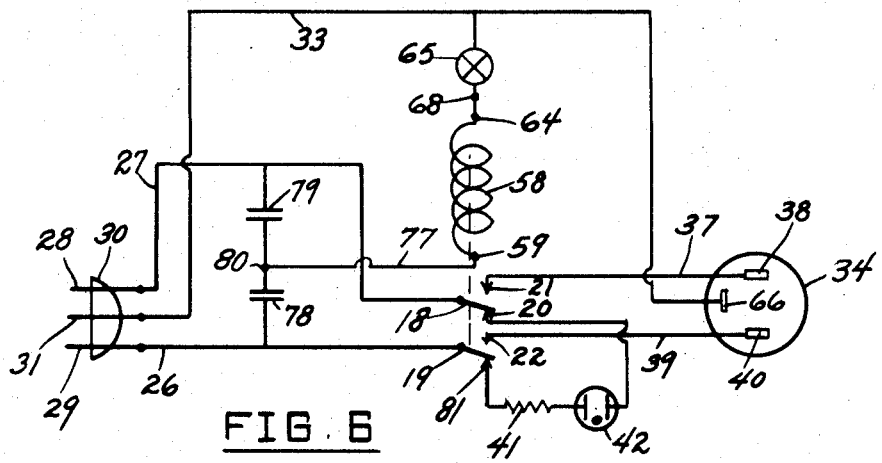
FIGURE 6 is a wiring diagram illustrating a still further modification according to the present invention.

In the embodiment shown in FIGURE 6, the relay coil is shown at 58, and series-connected condensers 78 and 79 are connected across the line wires 26 and 27, each of the condensers 78 and 79 being substantially of the proper capacity to resonate with the coil 58 at the power supply frequency. One terminal 64 of coil 58 is connected to the ground wire 33 through a load ground prong detection switch device 65, and the other terminal 59 is connected by a wire 77 to the common junction 80 of the condensers 78 and 79. In the absence of a proper ground connection at the supply socket there is no power supply connection to the coil terminal 64 and the coil 58 not energized. The signal lamp 42 is energized through contacts 18–20 and contacts 19–81 of the relay, as shown. However, if a proper supply socket ground connection is present (and switch device 65 is closed) the coil 58 will be connected across the line wires 26, 27 in series-resonance with one of the condensers 78 or 79 (and in parallel-resonance with the other condenser), allowing the relay coil 58 to draw a substantial amount of current and to therefore become energized.

Figure 7:
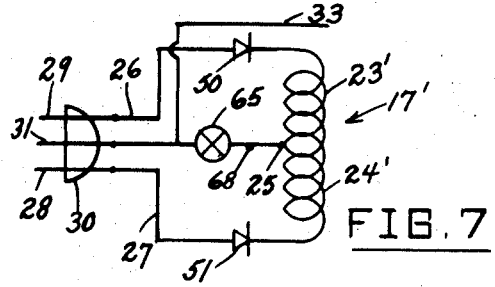
FIGURE 7 is a wiring digram showing another modification of the present invention.

The embodiment illustrated in FIGURE 7 is similar to that of FIGURE 2 except that a load ground prong detection switch device 65 is used in the connection between the common tap 25 of the double-wound relay coil 17' and the ground wire 33. The relay cannot become energized if a proper three-prong load plug 13 is not employed.

Figure 8:
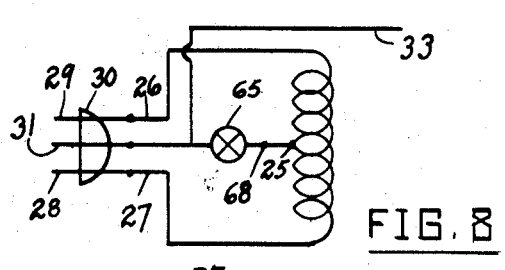
FIGURE 8 shows still another modification of the present invention.

The embodiment illustrated in FIGURE 8 is similar to that of either FIGURE 1 or FIGURE 3 except that a load ground prong detection switch device 65 is used in the connection between the common tap of the double-wound relay coil and the ground wire 33. As in the embodiment of FIGURE 7, the relay cannot become energized if a proper three-prong load plug is not employed.

Figure 9:
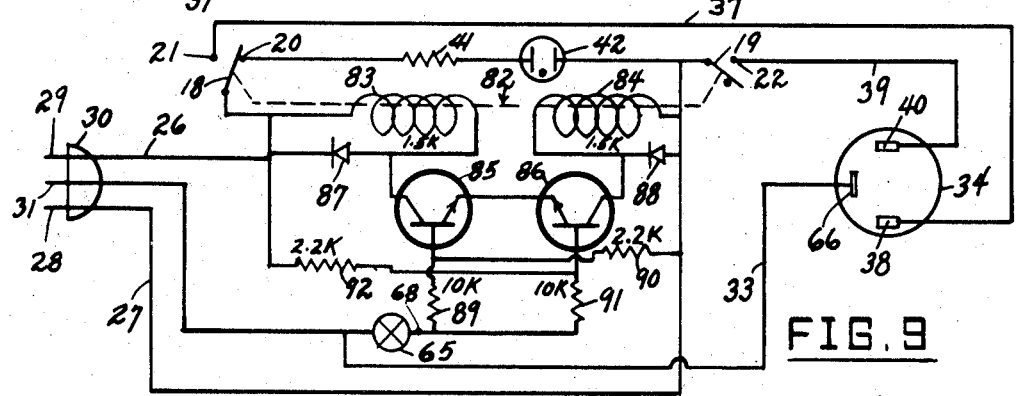
FIGURE 9 is a wiring diagram of still another protective device according to the present invention, employing a transistorized balanced circuit.

In the embodiment shown in FIGURE 9, a dual coil relay 82 is employed having the respective similar windings 83 and 84, the windings being interconnected, in the manner shown, with the respective transistors 85 and 86. Respective diode rectifiers 87 and 88 are connected across the windings. The winding 83 is connected between line wire 26 and the collector of transistor 85. The base of transistor 85 is connected to ground wire 33 through a resistor 89 and the prong detection switch device 65, and is connected to wire 27 through another resistor 90. The winding 84 is connected between the wire 27 and the collector of transistor 86. The base of transistor 86 is connected to ground wire 33 through a resistor 91 and the switch device 65, and is connected to wire 26 through another resistor 92. The emitter of transistor 85 is connected to the emitter of transistor 86. The resistance values of resistors 89 and 90 are the same as those of the respective resistors 91 and 92 to provide a balanced circuit configuration, and the circuit arrangement is such as to cause either coil 83 or 84 to become energized, depending on which side of the supply line is grounded. Assume prongs 29 and 31 are shorted together and switch 65 is closed. Also assume prong 29 to be more positive than prongs 31 and 28 at a given instant. Current will then flow through coil 83, transistor 85, transistor 86 (because the base of transistor 86 is positive with respect to the emitter of transistor 86) and then through diode 88. During the negative half cycle this circuit does not conduct. Thus, because of the conduction during the positive half cycle, coil 83 is effectively energized. If prongs 28 and 31 are shorted together, coil 84 becomes energized in a similar manner.

Figure 10:
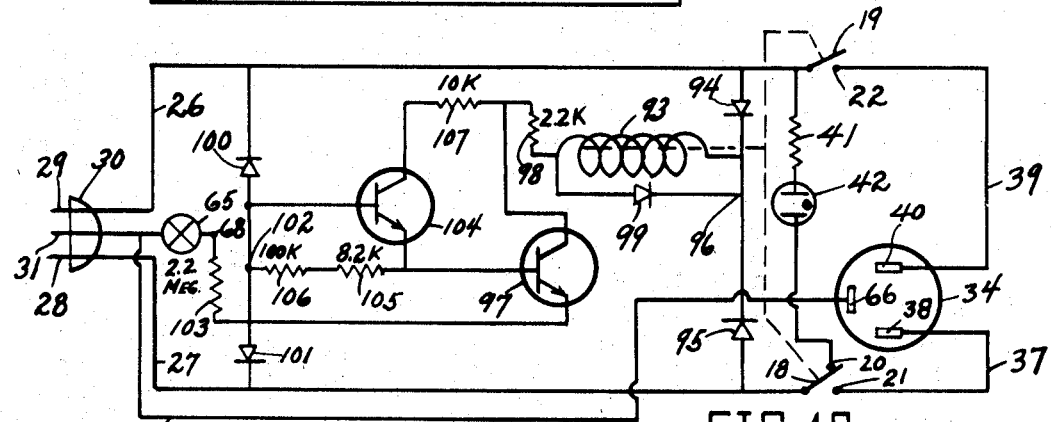
FIGURE 10 is a wiring diagram of still another transistorized safety device according to the present invention.

In the embodiment shown in FIGURE 10, the relay coil is shown at 93. Oppositely poled diodes 94 and 95 are connected in series across line wires 26 and 27, and coil 93 is connected between the junction 96 thereof and the collector of a transistor 97 through a resistor 98. A diode 99 is connected across coil 93. Another pair of oppositely poled diodes 100 and 101 (arranged reversely relative to diodes 94, 95) are connected in series across wires 26 and 27 and have a junction 102, which is connected to ground wire 33 through a high-value resistor 103 and a ground prong detection switch device 65. The base of a transistor 104 is connected to junction 102, and the base of transistor 97 is connected to junction 102 through series-connected resistors 105 and 106. The emitter of transistor 104 is connected to the base of transistor 97, and the collector of transistor 104 is connected to the collector of transistor 97 through a resistor 107. The relay coil 93 becomes energized when the base drive circuit (connected through switch device 65 to wire 33) is shorted to either side of the line. No current will flow to the base of transistor 104 when either of the prongs 29 or 28 is not grounded, and therefore coil 93 will not become energized. Assume prong 31 is connected to prong 28. Also assume that prong 28 is positive at a given instant. Current will then flow through the base of transistor 104 into the base of transistor 97 and then through diode 100. This will cause current to flow through diode 95, the relay coil 93, the collector and emitter of transistor 97, and through diode 100 to wire 26. This will cause relay coil 93 to become effectively energized. On the negative half cycle no current will flow. Diode 99 helps keep the relay energized during the negative half cycle due to the collapse of the magnetic field in the relay. Diodes 101 and 94 function in a manner similar to the diodes 100 and 95 when prong 29 is connected to prong 31.

While certain specific embodiments of ground-absence detection and protective devices have been disclosed in the foregoing description, it will be understood that various modifications within the spirit of the invention may occur to those skilled in the art.

What is claimed is:

1. A ground-absence detection and protective device comprising a three-prong plug engageable in a three-terminal current supply socket of the type having a female ground terminal intended to be internally connected to one of the socket current supply conductors, said plug having a pair of line prongs and a ground prong, balanced circuit means including a relay, means connecting said balanced circuit means across said pair of line prongs, said balanced circuit means having a center junction dividing the balanced circuit means into two substantially symmetrical circuit sections, means connecting said center junction to said ground prong, whereby one of said circuit sections is shunted when there is an internal connection between the socket female ground terminal and one of the socket current supply terminals when the plug is inserted in the socket, means to energize said relay from the line prongs responsive to the shunting of said one of the circuit sections, said relay having a pair of contacts closed when the relay is deenergized and open when the relay is energized, an electrical indicator, and circuit means connecting said indicator to said line prongs through said contacts, whereby the indicator will be energized when the plug is inserted in a three-terminal supply socket whose female ground terminal is not internally connected to one of its current supply conductors.

2. The detection and protective device of claim 1, and a pair of load conductors, and circuit means connecting said load conductors to said line prongs responsive to the energization of the relay.

3. The detection and protective device of claim 2, and wherein said last-named circuit means include normally open contacts of the relay connected in circuit with at least one of the load conductors, said last-named contacts closing responsive to the energization of the relay.

4. The detection and protective device of claim 2, and an outlet socket having a pair of line outlet terminals and a ground prong-receiving terminal, circuit means connecting said line outlet terminals to said load conductors, and circuit means to connect said ground prong-receiving terminal to said center junction.

5. The detection and protective device of claim 4, and wherein said last-named circuit means includes switch means closed only responsive to the presence of a prong in said ground prong-receiving terminal.

6. The detection and protective device of claim 5, and wherein said switch means comprises a pair of spaced conductors in the outlet socket, spaced to be bridged by a prong inserted in the ground prong-receiving terminal.

7. The detection and protective device of claim 1, and wherein the relay has two similar windings, each winding forming a part of one of said circuit sections.

8. The detection and protective device of claim 7, and wherein the two windings have a common junction.

9. The detection and protective device of claim 1, and wherein the circuit sections comprise two substantially similar impedances connected in circuit across the pair of line prongs, said center junction being the common junction of said two impedances.

10. The detection and protective device of claim 9, and wherein said impedances have substantially unidirectional current conduction properties and are oppositely poled in the circuit connecting them across the pair of line prongs.

References Cited

UNITED STATES PATENTS

| | | |
|---|---|---|
| 405,572 | 6/1889 | Loomis. |
| 3,320,480 | 5/1967 | Failor _____ 317—18 |

FOREIGN PATENTS 427,183  4/1935  Great Britain.

JOHN W. CALDWELL, *Primary Examiner.*

D. K. MYER, *Assistant Examiner.*

U.S. Cl. X.R.

317—18